(12) United States Patent
Bocking

(10) Patent No.: US 8,411,100 B2
(45) Date of Patent: Apr. 2, 2013

(54) USER INTERFACE AND METHOD FOR PERSISTENT VIEWING OF A USER SELECTED FOLDER ON A MOBILE DEVICE

(75) Inventor: Andrew D. Bocking, Waterloo (CA)

(73) Assignee: Research In Motion Limited, Waterloo (CA)

( * ) Notice: Subject to any disclaimer, the term of this patent is extended or adjusted under 35 U.S.C. 154(b) by 393 days.

(21) Appl. No.: 12/335,930

(22) Filed: Dec. 16, 2008

(65) Prior Publication Data

US 2009/0264158 A1    Oct. 22, 2009

Related U.S. Application Data

(63) Continuation of application No. 10/946,461, filed on Sep. 21, 2004, now Pat. No. 7,466,320.

(51) Int. Cl.
*G06T 15/00* (2006.01)
(52) U.S. Cl. .......... 345/589; 706/45; 709/203; 709/248; 715/206; 715/826
(58) Field of Classification Search ................. 345/589; 706/45; 709/203, 248; 715/206, 826
See application file for complete search history.

(56) References Cited

U.S. PATENT DOCUMENTS

| | | | |
|---|---|---|---|
| 5,555,346 A * | 9/1996 | Gross et al. ................. 706/45 |
| 6,100,890 A * | 8/2000 | Bates et al. ................. 715/826 |
| 6,453,403 B1 | 9/2002 | Czajkowski |
| 6,708,221 B1 | 3/2004 | Mendez et al. |
| 6,727,927 B1 | 4/2004 | Dempski et al. |
| 6,819,267 B1 | 11/2004 | Edmark et al. |
| 6,820,111 B1 * | 11/2004 | Rubin et al. ................. 709/203 |
| 7,146,415 B1 | 12/2006 | Doi |
| 7,287,097 B1 * | 10/2007 | Friend et al. ................. 709/248 |
| 7,296,025 B2 * | 11/2007 | Kung et al. ................. 1/1 |
| 7,454,706 B1 * | 11/2008 | Matthews et al. ........... 715/713 |
| 7,496,830 B2 * | 2/2009 | Rubin et al. ................. 715/206 |

FOREIGN PATENT DOCUMENTS

| EP | 1 109 092 | 6/2001 |
|---|---|---|
| WO | 2004/023283 A1 | 8/2004 |

OTHER PUBLICATIONS

USPTO, Office Action, U.S. Appl. No. 10/946,461, Sep. 11, 2006, 10 pgs.
USPTO, Office Action, U.S. Appl. No. 10/946,461, Mar. 12, 2007, 9 pgs.
USPTO, Office Action, U.S. Appl. No. 10/946,461, Sep. 10, 2007, 9 pgs.
USPTO, Office Action, U.S. Appl. No. 10/946,461; Feb. 28, 2008, 10 pgs.
eDAN (eDAN Training Manual for Examiners), Jan. 2004, M03267.07, pp. 4.1-4.20, 20 pgs.

* cited by examiner

*Primary Examiner* — Phu K Nguyen
(74) *Attorney, Agent, or Firm* — The Danamraj Law Group, P.C.

(57) ABSTRACT

A mobile device includes a display having a plurality of display modes including a folder view display mode wherein a plurality of folders are viewable. An input device is operable to change the display mode of the display between the folder view display mode and other display modes. A memory within the mobile device stores a folder that has been previously identified for persistent viewing. A processor controls the operation of the mobile device such that after the folder previously identified for persistent viewing is stored in memory, when the folder view display mode is entered, the folder is automatically displayed on the display.

24 Claims, 4 Drawing Sheets

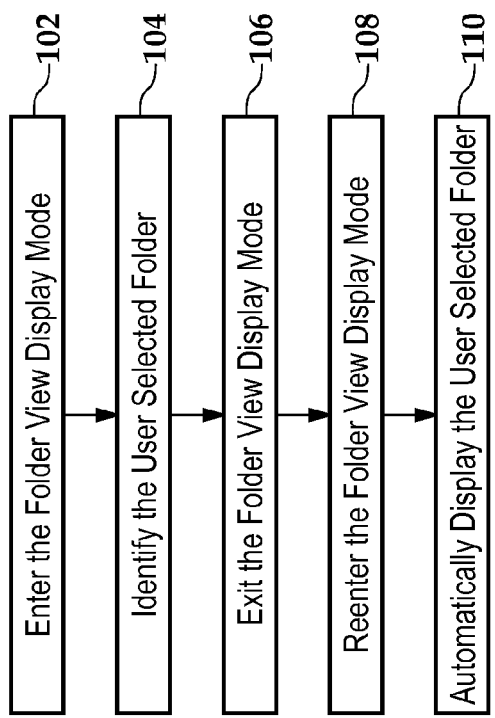
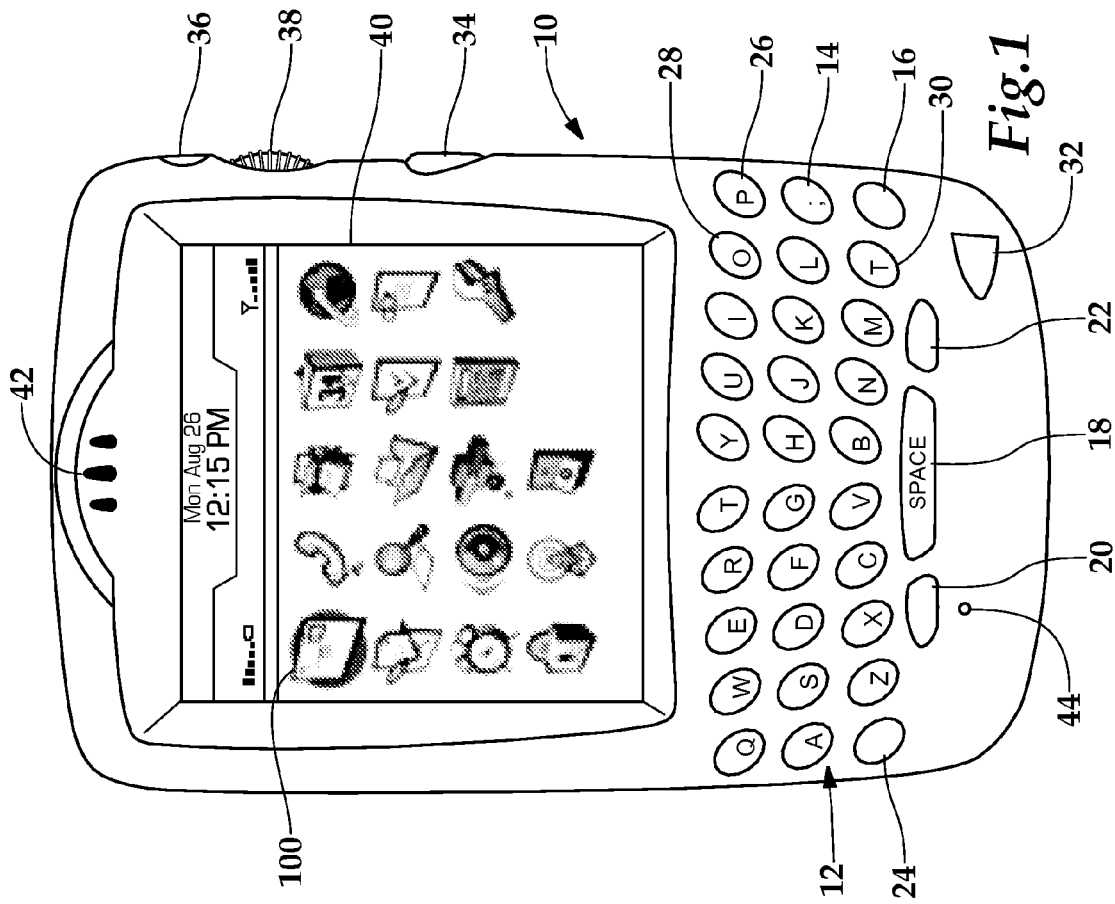

USER INTERFACE AND METHOD FOR PERSISTENT VIEWING OF A USER SELECTED FOLDER ON A MOBILE DEVICE

TECHNICAL FIELD

This nonprovisional application is a continuation application claiming the benefit of the following prior United States patent application entitled: "USER INTERFACE AND METHOD FOR PERSISTENT VIEWING OF A USER SELECTED FOLDER ON A MOBILE DEVICE", filed Sep. 21, 2004, application Ser. No. 10/946,461, which is hereby incorporated by reference.

The present application relates, in general, to a user interface for a mobile device and, in particular, to a user interface that displays a persistent view of a user selected folder on the mobile device.

BACKGROUND

In wireless communication networks, such as Code Division Multiple Access (CDMA) and Global Service Mobile (GSM) networks, standard telephony based services as well as data services are supported. For example, General Packet Radio Service (GPRS), Universal Mobile Telecommunications System (UMTS), Enhanced Data for GSM Enhancement (EDGE) and 1X, which overlay cellular networks, allow appropriately configured mobile devices to offer data services including Short Message Service (SMS), Wireless Application Protocol (WAP), Multimedia messaging service (MMS), e-mail service, web browsing service and the like.

The mobile devices used to access these services are capable of storing information relating to various communications events. For example, these communications events include incoming and outgoing telephone calls, incoming and outgoing SMS messages, incoming and outgoing e-mails, WAP sessions and the like. More generally, these communications events include any form of communication between the user of the mobile device and at least one correspondent. As the user of the mobile device may communicate with any number of correspondents regarding any number of subject matters via a variety of communication types, the user of the mobile device may desire to organize these communications events based upon the user's desired criteria. As such, the user may desire to create a directory or folder structure for storing and organizing various communications events.

For example, the user may create a simple folder structure wherein certain types of messages, such as email messages, are stored together. In this example, a hierarchical structure including a top level folder, such as Mailbox, having second level folders, such as, Inbox, Outbox, Sent Items, Drafts and Deleted Items, may be suitable. It has been found, however, that many mobile device users desire a more sophisticated folder structure. For example, the user may desire to have third level folders within the Inbox folder to better organize communications events by subject matter, such as Status Reports, T3 Project, S2 Project, Clients and Prospects. Within the third level folders, the user may likewise create fourth level folders, fifth level folders and so forth to specify particular criteria such as one or more correspondents folders within, for example, the Status Reports folder and one or more urgency level folders within the correspondents folders.

It has been found, however, that the more sophisticated the folder structure becomes, the more difficult it is to access a given folder. In the example above, if the user desires to access an email from Ted Jones regarding a status report, the user would have to display the list of folders, select the Mailbox folder, select the Inbox folder, select the Status Reports folder, select the Ted Jones folder then identify the desired email message within the Ted Jones folder. Once the user accesses another functionality of the mobile device, such as the calender function, if the user again desires to access this email from Ted Jones, the user would have to repeat the process of penetrating through the folder structure. Therefore, a need has arisen for a mobile device that allows the user to store and organize various communications events without requiring the user to penetrate through complicated folder structures to access desired information.

SUMMARY

The present mobile device disclosed herein allows the user to store and organize various communications events without requiring the user to penetrate through complicated folder structures to access desired information.

In an embodiment, the mobile device includes a display that has a plurality of display modes including a folder view display mode wherein a plurality of folders is viewable. The mobile device has an input device such as input keys, a track wheel or the like that is operable to interact with a menu on the display. Through this interaction, the input device is operable to change the display mode of the display between the folder view display mode and other display modes. The mobile device also includes a memory that stores a user selected folder selected from the plurality of folders. The user selected folder may be selected based upon the user viewing the contents of a particular folder, the frequency of the user to view a folder, the most recent folder opened by the user or other criteria. Once the user selected folder is stored in memory, the next time the input device is operated to change the display mode of the display to the folder view display mode, a processor, that controls the operation of the mobile device, causes the user selected folder to be automatically displayed on the display.

The user selected folder may be displayed as a collapsed folder within the folder structure, an expanded folder within the folder structure, a top level folder, a view of the contents of that folder with the name of the user selected folder displayed in a banner bar or the like. In addition, the user selected folder may contain communication events relating to a particular correspondent, communication events of a particular type, communication events relating to a particular subject matter, communication events of a particular status or the like.

In another aspect, a method for persistent display of a user selected folder in a mobile device having a user interface is disclosed. The method comprises entering a folder view display mode of the mobile device wherein the user interface displays a plurality of folders, identifying the user selected folder from the plurality of folders viewable on the user interface of the mobile device, exiting the folder view display mode of the mobile device, reentering the folder view display mode of the mobile device and automatically displaying the user selected folder on the user interface of the mobile device.

BRIEF DESCRIPTION OF THE DRAWINGS

For a more complete understanding of the features and advantages of the present method and mobile device, reference is now made to the detailed description along with the accompanying figures in which corresponding numerals in the different figures refer to corresponding parts and in which:

FIG. 1 is a front view of a mobile device showing the display screen and input devices enabling communication over a wireless communication network;

FIG. 11 is a flow diagram illustrating a method of operating a mobile device.

DETAILED DESCRIPTION

Figure 2:
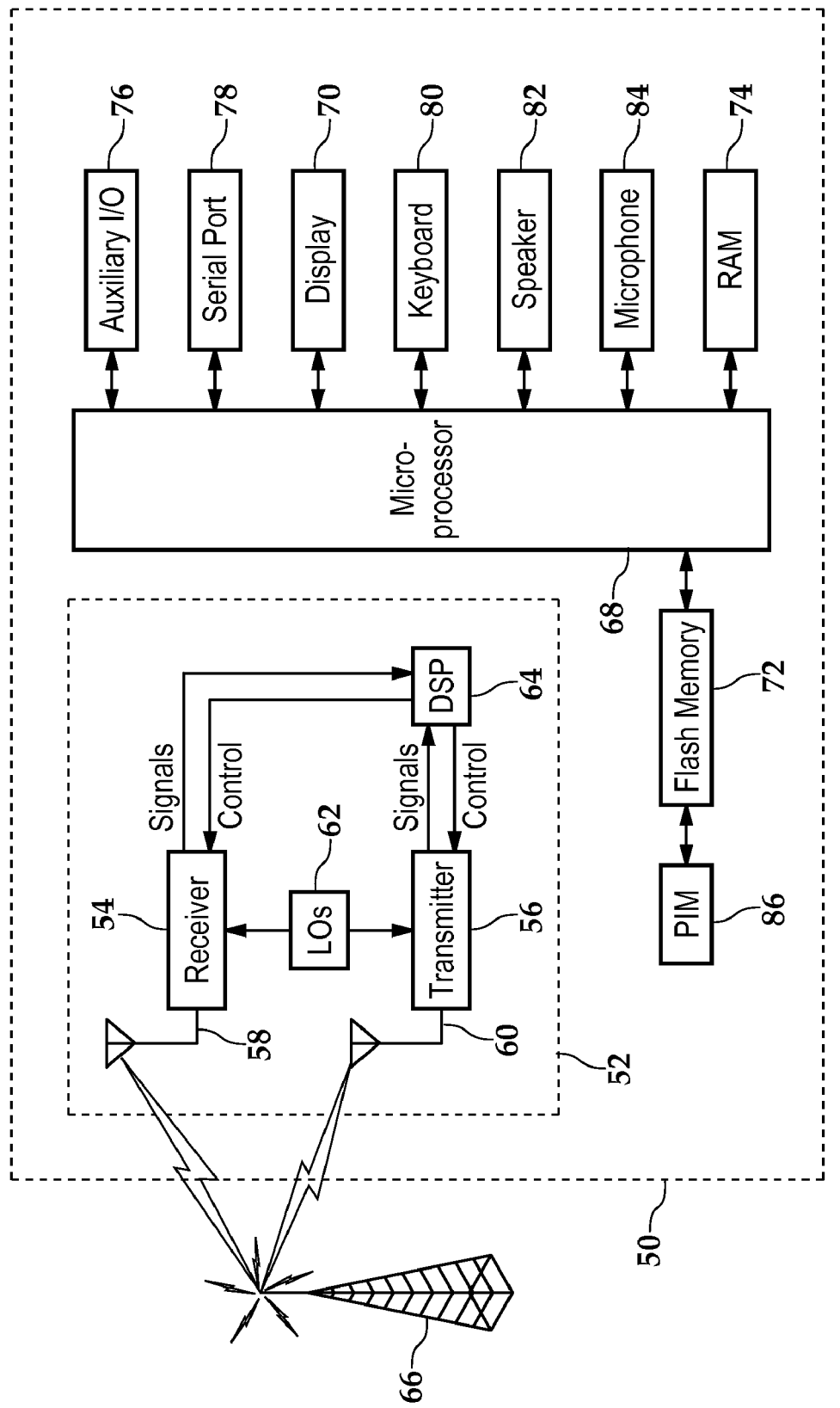
FIG. 2 is a block diagram illustrating the components of a mobile device.

While the operation of various embodiments of a mobile device is discussed in detail below, it should be appreciated that the present application provides many applicable inventive concepts which can be embodied in a wide variety of specific contexts. The specific embodiments discussed herein are merely illustrative of specific ways to use the mobile device, and do not delimit the scope of the present application.

Referring initially to FIG. 1, therein is depicted one embodiment of a mobile device that enables communication over a wireless communication network that is generally designated 10. Device 10 includes a keyboard 12 that has a plurality of alphabetic keys, numeric keys and special keys such as backspace key 14, enter key 16, space key 18, shift keys 20, 22, alt key 24, forward key 26, back key 28 and symbol key 30. Device 10 also includes a power button 32, an escape button 34 and a phone button 36. In addition, device 10 includes a track wheel 38 that enables the user to navigate, view and select items displayed on user interface display screen 40. Device 10 further includes a speaker 42 and microphone 44 to enable voice communications.

Referring next to FIG. 2, a block diagram illustrating one embodiment of a mobile device is generally designated 50. Mobile device 50 is preferably a two-way wireless communication device having at least voice and data communication capabilities and has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance or a data communication device, as examples.

In the illustrated embodiment, mobile device 50 is enabled for two-way communication via a communication subsystem 52, including a receiver 54 and a transmitter 56, as well as associated components such as one or more, preferably embedded or internal, antenna elements 58, 60, local oscillators (LOs) 62 and a processing module such as a digital signal processor (DSP) 64. Communication subsystem 52 is designed to communicate on communication network 66. As will be apparent to those skilled in the field of communications, however, the particular design of the communication subsystem 52 will be dependent upon the communication network in which the device is intended to operate. For example, mobile device 50 may include a communication subsystem 52 designed to operate within the Mobitex™ mobile communication system, the DataTAC™ mobile communication system, GPRS network, UMTS network, EDGE network or CDMA network.

Mobile device 50 preferably includes a microprocessor 68 which controls the overall operation of mobile device 50. Microprocessor 68 interacts with communication subsystem 52 to enable data and voice communications. Likewise, microprocessor 68 interacts with further device subsystems such as display 70, flash memory 72, random access memory (RAM) 74, auxiliary input/output (I/O) subsystems 76, serial port 78, keyboard 80, speaker 82 and microphone 84 as well as other communications subsystems or other device subsystems known to those skilled in the art.

Operating system software used by microprocessor 68 is preferably stored in flash memory 72 or other persistent store such as a read-only memory (ROM). Those skilled in the art will appreciate that the operating system, specific device applications, or parts thereof, may be temporarily loaded into a volatile memory such as RAM 74. Received communication signals may also be stored in RAM 74. Those skilled in the art will also appreciate that flash memory 72 can be segregated into different areas for both computer programs and program data storage requirements. Microprocessor 68 preferably enables execution of the software applications on mobile device 50.

A predetermined set of applications that control basic operations, including at least data and voice communication applications for example, will normally be installed on mobile device 50 during manufacturing. For example, mobile device 50 preferably includes a personal information manager (PIM) application 86 having the ability to organize and manage communication events relating to the user of the mobile device 50 such as, but not limited to, e-mails, voice mails, phone calls and SMS messages as well as data items such as, but not limited to, calendar events, appointments and task items. PIM application 86 preferably has the ability to send and receive data items via wireless network 66 and to seamlessly integrated, synchronized and updated, via the wireless network 66, with the user's corresponding data items stored or associated with a host computer system.

In a data communication mode, a received signal, such as a text message or web page download, will be processed by communication subsystem 52 and input to microprocessor 68, which preferably further processes the received signal for output to display 70. Likewise, a user of mobile device 50 may compose data items such as email messages using keyboard 80, in conjunction with display 70. Such composed items may then be transmitted over communication network 66 via communication subsystem 52.

As the user of the mobile device may communicate with any number of correspondents regarding any number of subject matters via a variety of communication types, the user of mobile device 50 may desire to organize these communications events based upon a set of user desired criteria. As such, the user may desire to create a directory or folder structure for storing and organizing various communications events.

Figure 3:
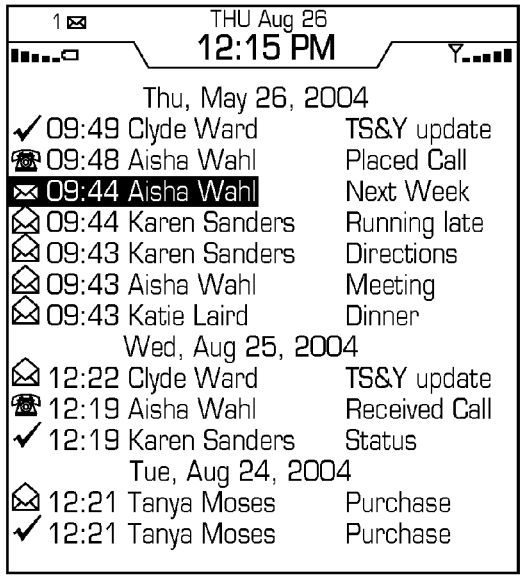
FIGS. 3-10 are screen shots illustrating the user interface of a mobile device.

For example, from the main menu display mode, as seen in FIG. 1, the user may select the messages display mode by navigating to and selecting the messages icon 100. The messages display mode, as seen in FIG. 3, displays communications events of a variety of types from a variety of correspondents relating to a variety of subjects. In the illustrated embodiment, the messages display mode includes incoming calls, outgoing calls, opened emails, unopen emails, open SMS messages and the like that are segregated by day. The time of messages, along with the name of the correspondent and the subject matter is also displayed. The messages displayed in the messages display mode represent messages that have not been deleted or saved to a user specified folder.

Figure 4:
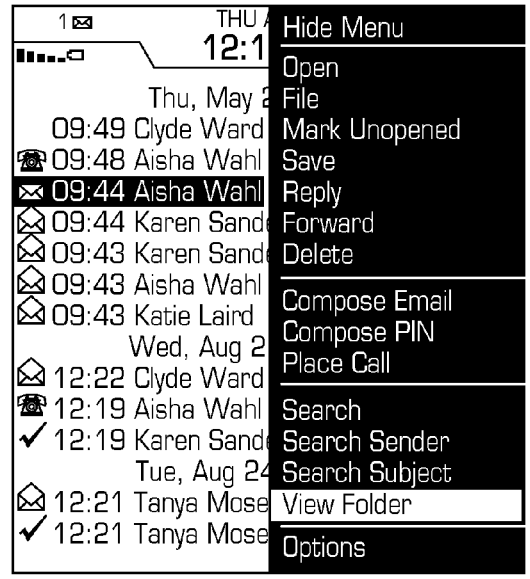

From the messages display mode the user may operate track wheel 38 which causes a menu to be instantiated on the right side of user interface display screen 40 as seen in FIG. 4. The menu includes a variety of options relating to the selected message including open, file, save, reply, forward and delete. In addition, the menu allows the user of compose messages, place a call and search for messages. Importantly, the menu also includes a View Folder command that allows the user to operate the mobile device to the folder view display mode.

Figure 5:
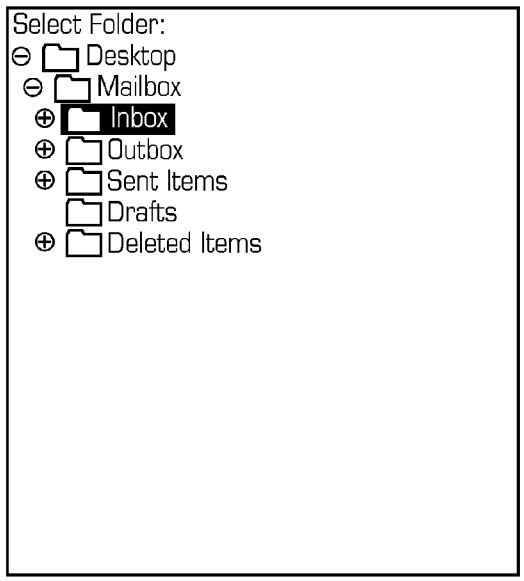

FIG. 5 depicts one example of the folder view display mode wherein a folder structure is displayed including a top level folder of Desktop, a first level folder of Mailbox and five second level folders of Inbox, Outbox, Sent Items, Drafts and Deleted Items. The minus sign by a folder, such as the Mailbox folder, represents a folder that is expanded, the plus sign by a folder, such as the Inbox folder, represents a folder that is collapsed and if no symbology is present by a folder, such as the Drafts folder, this represents an empty folder. Once the user is in the folder view display mode, the user may expand or collapse specific folders by navigating to and selecting that folder.

Figure 6:
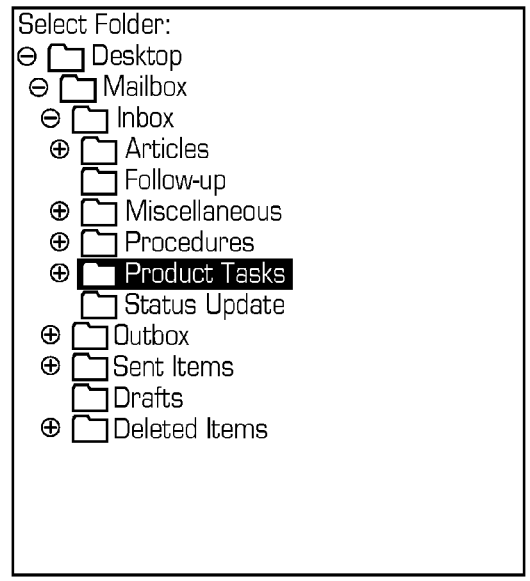
Figure 7:
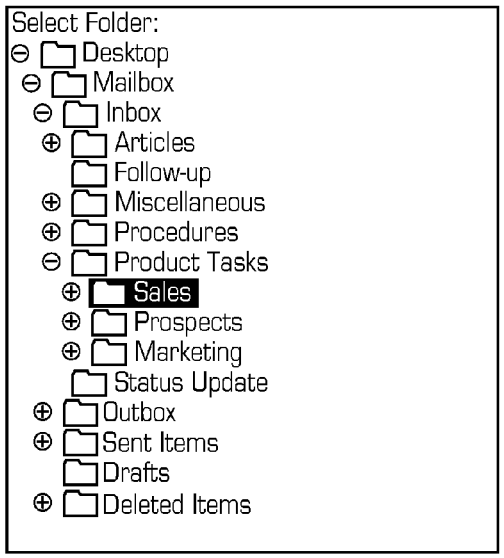
Figure 8:
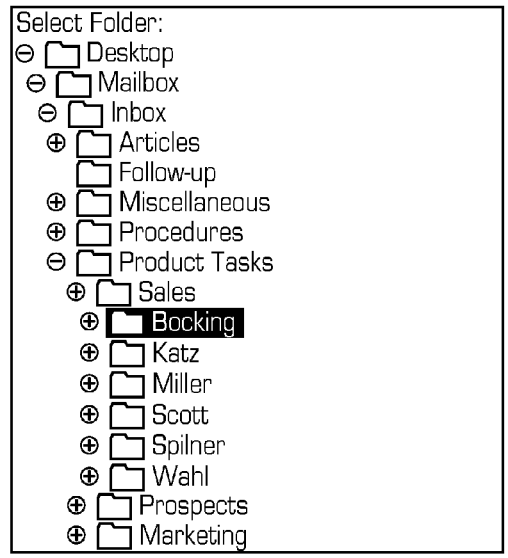

In the illustrated embodiment, the user has navigated to and selected the Inbox folder. As best seen in FIG. 6, the Inbox folder has been expanded to display a plurality of third level folders including an Articles folder, a Follow-up folder, a Miscellaneous folder, a Procedures folder, a Product Tasks folder and a Status Updates folder. The user then navigates to and selects the Product Tasks folder. As best seen in FIG. 7, the Product Tasks folder has been expanded to display a plurality of fourth level folders including a Sales folder, a Prospects folder and a Marketing folder. Next, the user navigates to and selects the Sales folder. As best seen in FIG. 8, the Sales folder has been expanded to display a plurality of fifth level folders including a Bocking folder, a Katz folder, a Miller folder, a Scott folder, a Spilner folder and a Wahl folder. Now the user navigates to and selects the Bocking folder.

Figure 9:
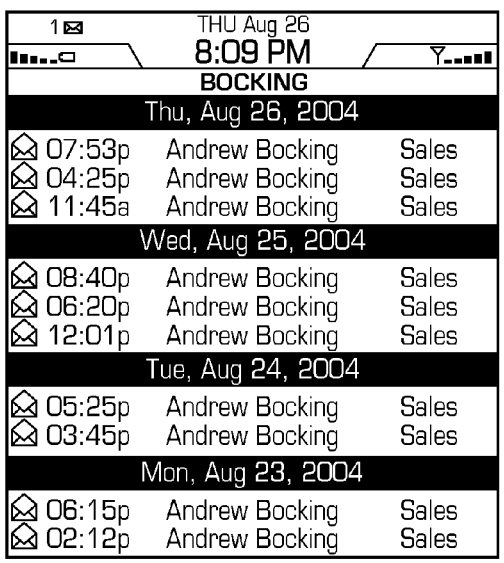

As best seen in FIG. 9, the contents of the Bocking folder are displayed which include numerous emails from an Andrew Bocking which have been read by the user. More specifically, the Bocking folder displays these emails sorted by date received. In addition, it is noted that the displayed information includes the time received, the name of the correspondent, Andrew Bocking, and the subject of the email, sales. As can be seen, to penetrate through multiple levels within a folder structure can be a time consuming task. This is particularly true the more sophisticated the folder structures become, thereby making it more difficult to access a given folder within the structure. After retrieving this desired information, the user will commonly desire to use some other functionality of the mobile device. Once the user has exited the folder view display mode, a user of a conventional mobile device would have to repeat the above steps to view the contents of the Bocking folder again. As a user commonly desires to return to the most recently viewed folder, the present mobile device facilitate improved access to that folder.

Specifically, in one embodiment, the most recently accessed or viewed folder is stored in a persistent memory, such as flash memory 72 of FIG. 2, as the user selected folder. Alternatively, the user may select the user selected folder by other identification techniques, such as a default designation, that are known to those skilled in the art. Once the user selected folder has been identified and stored in memory, the use can enjoy the other functionalities of the mobile device including operating the mobile device to other display modes. When the user returns to the folder view display mode such as by entering the messages display mode from the main menu display mode, as described above with reference to FIG. 3, and selecting the View Folder command in the drop down menu, as described above with reference to FIG. 4, the user selected folder will automatically be displayed on user interface display screen 40.

Based upon user preference, the user selected folder, in this example the Bocking folder, will be displayed on user interface display screen 40 in one of a variety of configurations. In one embodiment, the user selected folder is displayed as a collapsed folder viewable within the folder structure. An example of this embodiment is the folder structure depicted in FIG. 8. In other words, once the user selected folder has been identified and stored in memory and the user returns to the folder view display mode, the folder structure of FIG. 8 is automatically instantiated such that with a single selection, the user can access the contents of the Bocking folder.

In another embodiment, the contents of the user selected folder are automatically displayed on user interface display screen 40 with the name of the folder displayed in the banner bar of the display. An example of this embodiment is depicted in FIG. 9. In yet another embodiment, the user selected folder is displayed as a top level folder viewable above the rest of the default folder structure. An example of this embodiment is the folder structure depicted in FIG. 10 wherein the Bocking folder appears above the Desktop folder.

Figure 10:
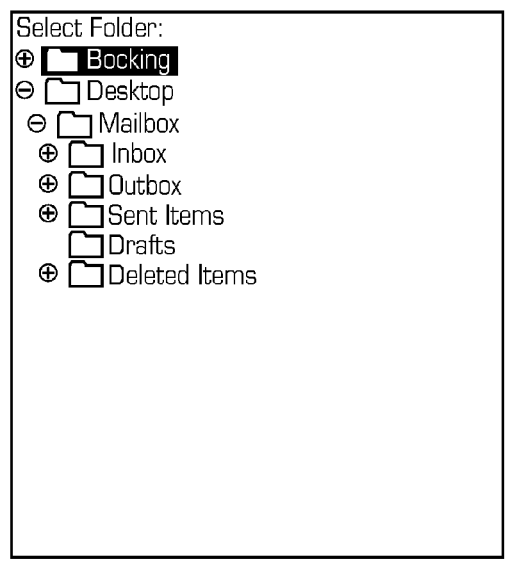

In any of the above embodiments, the user of the mobile device is able to quickly access the desired information in the user selected folder. In the embodiment of FIGS. 8 and 10, the user also has direct access to other folders. In the embodiment of FIG. 9, the user is not required to make additional selections to view the contents of the user selected folder. Importantly, the user selected folder is changeable as the user of the mobile device accesses other folders within the folder structure. In one preferred embodiment, the most recently accessed folder automatically becomes the user selected folder upon exiting the folder view display mode.

Referring now to FIG. 11, a flow diagram illustrating a method of operating a mobile. In block 102, the method involves entering a folder view display mode of the mobile device such that the user interface displays a plurality of folders. In block 104, the user selected folder is identified from the plurality of folders viewable on the user interface of the mobile device. The user selected folder may be identified by accessing or viewing the contents of the desired folder. In block 106, the user exits the folder view display mode of the mobile device. Upon exit, the user selected folder identified in block 104 is stored in memory. Thereafter, in block 108, the user reenters the folder view display mode of the mobile device. Upon such reentry, in block 110, the user selected folder is automatically displayed on the user interface of the mobile device.

While this application has described a mobile device with reference to illustrative embodiments, this description is not intended to be construed in a limiting sense. Various modifications and combinations of the illustrative embodiments as well as other embodiments of the mobile device, will be apparent to persons skilled in the art upon reference to the description. It is, therefore, intended that the appended claims encompass any such modifications or embodiments.

What is claimed is:

1. A method for automatic redisplay of a previously-selected folder in a data-enabled wireless mobile device having a user interface, the method comprising:
   entering an expandable and navigable folder structure displayable in a folder view display mode of the data-enabled wireless mobile device, wherein at least one folder within the expandable and navigable folder structure is displayable on the user interface; and
   automatically redisplaying the previously-selected folder on the user interface of the data-enabled wireless mobile device, wherein the previously-selected folder is contained within at least one higher-level folder within the expandable and navigable folder structure.

2. The method as recited in claim 1 wherein the previously-selected folder comprises a folder other than a top level folder of the folder structure.

3. The method as recited in claim 1 wherein the previously-selected folder comprises a top level folder of the folder structure.

4. The method as recited in claim 1 wherein the previously-selected folder comprises one or more subfolders in a hierarchical structure and further wherein the folder with one or more subfolders is displayed as a collapsed folder.

5. The method as recited in claim 1 wherein contents of the previously-selected folder are automatically displayed when the folder view display mode is entered.

6. The method as recited in claim 1 wherein the previously-selected folder comprises a Mailbox folder of the folder structure.

7. The method as recited in claim 1 wherein the previously-selected folder comprises an Outbox folder of the folder structure.

8. The method as recited in claim 1 wherein the previously-selected folder comprises a Sent Items folder of the folder structure.

9. The method as recited in claim 1 wherein the previously-selected folder comprises a Deleted Items folder of the folder structure.

10. A data-enabled wireless mobile device having a user interface for automatic redisplay of a previously-selected folder, the data-enabled wireless mobile device comprising:
   means for entering an expandable and navigable folder structure displayable in a folder view display mode of the data-enabled wireless mobile device, wherein at least one folder within the expandable and navigable folder structure is displayable on the user interface; and
   means for automatically displaying the previously-selected folder on the user interface of the data-enabled wireless mobile device, wherein the previous-selected folder is contained within at least one higher-level folder of an expandable and navigable folder structure.

11. The data-enabled wireless mobile device as recited in claim 10 wherein the previously-selected folder comprises a folder other than a top level folder of the folder structure.

12. The data-enabled wireless mobile device as recited in claim 10 wherein the previously-selected folder comprises a top level folder of the folder structure.

13. The data-enabled wireless mobile device as recited in claim 10 wherein the previously-selected folder comprises one or more subfolders in a hierarchical structure and further wherein the folder with one or more subfolders is displayed as a collapsed folder.

14. The data-enabled wireless mobile device as recited in claim 10 wherein contents of the previously-selected folder are automatically displayed when the folder view display mode is entered.

15. The data-enabled wireless mobile device as recited in claim 10 wherein the previously-selected folder comprises one of a Mailbox folder, an Inbox folder, an Outbox folder, a Sent Items folder, a Deleted Items folder and a Drafts folder of the folder structure.

16. A data-enabled wireless mobile device comprising:
   a display having a plurality of display modes including a folder view display mode wherein a folder structure having one or more folders is viewable, expandable and navigable;
   an input device operable to change the display mode of the display between the folder view display mode and other display modes;
   a memory adapted to store a previously-selected folder for automatic redisplay; and
   a processor coupled to the display, the input device, and the memory for controlling the operation of the data-enabled wireless mobile device such that when the folder view display mode is entered, the previously-selected folder is automatically displayed on the display.

17. The data-enabled wireless mobile device as recited in claim 16 wherein the input device further comprises an input key adapted to interact with a menu on the display.

18. The data-enabled wireless mobile device as recited in claim 16 wherein the input device further comprises a track wheel adapted to interact with a menu on the display.

19. The data-enabled wireless mobile device as recited in claim 16 wherein the previously-selected folder comprises one or more subfolders in a hierarchical structure and further wherein the folder with one or more subfolders is displayed as a collapsed folder.

20. The data-enabled wireless mobile device as recited in claim 16 wherein the previously-selected folder comprises a top level folder of the folder structure.

21. The data-enabled wireless mobile device as recited in claim 16 wherein contents of the previously-selected folder are automatically displayed when the folder view display mode is entered.

22. The data-enabled wireless mobile device as recited in claim 16 wherein the previously-selected folder comprises a folder other than a top level folder of the folder structure.

23. The data-enabled wireless mobile device as recited in claim 16 wherein the previously-selected folder contains communication events of a particular type.

24. The data-enabled wireless mobile device as recited in claim 16 wherein the previously-selected folder comprises one of a Mailbox folder, an Inbox folder, an Outbox folder, a Sent Items folder, a Deleted Items folder and a Drafts folder of the folder structure.

* * * * *